US 008128118B2

(12) United States Patent
Friisdahl et al.

(10) Patent No.: US 8,128,118 B2
(45) Date of Patent: Mar. 6, 2012

(54) ADJUSTABLE ACTIVITY STROLLER

(75) Inventors: Aneta Friisdahl, Toronto (CA);
Maureen Hummel, Maple (CA);
Robert G. Dickie, King City (CA)

(73) Assignee: Activity Stroller Inc., Toronto, Ontario (CA)

( * ) Notice: Subject to any disclaimer, the term of this patent is extended or adjusted under 35 U.S.C. 154(b) by 518 days.

(21) Appl. No.: 12/261,734

(22) Filed: Oct. 30, 2008

(65) Prior Publication Data
US 2010/0109293 A1    May 6, 2010

(51) Int. Cl.
*B62B 1/00*    (2006.01)
(52) U.S. Cl. ...... 280/642; 280/650; 280/658; 280/47.38
(58) Field of Classification Search .................. 280/642, 280/647, 47.38, 87.051, 650, 652, 649, 658; 297/5, 137
See application file for complete search history.

(56) References Cited

U.S. PATENT DOCUMENTS

| 1,793,848 | A | * | 2/1931 | Gill et al. | 280/87.051 |
| 2,415,146 | A | | 2/1947 | Nanna | |
| 3,109,666 | A | * | 11/1963 | Wilson | 280/648 |
| 5,090,724 | A | | 2/1992 | Fiore | |
| 5,125,674 | A | | 6/1992 | Manuszak | |
| 5,364,120 | A | * | 11/1994 | Shimansky | 280/650 |
| 5,664,795 | A | * | 9/1997 | Haung | 280/47.38 |
| 5,839,748 | A | | 11/1998 | Cohen | |
| 6,203,054 | B1 | * | 3/2001 | Matsumoto | 280/647 |
| 6,530,591 | B2 | * | 3/2003 | Huang | 280/650 |
| 7,234,722 | B1 | * | 6/2007 | Madigan et al. | 280/642 |
| 7,712,765 | B2 | * | 5/2010 | Chen et al. | 280/642 |
| 7,775,548 | B2 | * | 8/2010 | McIntyre et al. | 280/650 |

* cited by examiner

*Primary Examiner* — Hau Phan
(74) *Attorney, Agent, or Firm* — Sand & Sebolt

(57) ABSTRACT

A stroller for a young child comprising a frame mounted on a plurality of wheels and a seat mounted in the frame. The seat is adjustable between a first position where the child is retained in a reclined or semi-reclined orientation, and a second position where the child is retained in an orientation that permits them to sit and stand. The seat includes a bottom that is pivotally attached to a back. A sling member is secured between the frame and back such that when the bottom is pivoted out of the way, the sling supports the child in the seated or standing position.

25 Claims, 13 Drawing Sheets

ADJUSTABLE ACTIVITY STROLLER

BACKGROUND OF THE INVENTION

1. Technical Field

This invention generally relates to strollers. More particularly, the invention relates to adjustable strollers. Specifically, the invention relates to a stroller that is movable between a first position where the child is retained in an inclined orientation and a second position where the child is able to freely move between a seated and a standing position.

2. Background Information

There are many strollers in the market and these strollers are typically used to convey children between the ages of newborn to around two and a half years old. Newborns and infants need to be retained in the stroller in an orientation that varies between complete reclined and semi-inclined. These orientations are required because of the need to support the child's neck and head region.

As children grow older and are able to sit, crawl and walk, being continually retained in a semi-inclined or totally reclined position is a source of frustration for the child. This issue has been addressed in the prior art by providing strollers that may be adjusted between a reclined or semi-inclined position and a seated position. However, as any parent will testify, young children can only be retained in a seated position for a length of time and then they tend to grow restless and irritable.

This need has been addressed to a limited degree in the prior art. For example, U.S. Pat. No. 2,415,146 issued to Nanna, discloses combination baby walker and stroller. The device includes a seat with two leg holes formed therein. The seat is resiliently suspended in the frame of the device by springs. A footboard is positioned beneath the seat to prevent the child's feet from contacting the surface. When the device is to be used as a stroller, a handle is attached to the device and the footboard is retained in place beneath the seat. When the device is to be used as a walker, the handle is removed as is the footboard so the child's feet may contact the surface.

U.S. Pat. No. 5,090,724 issued to Fiore discloses a stand-up stroller which allows a child to move between a standing and a seated position. The stroller has the appearance of a shopping cart and includes a frame that surrounds the child. A collapsible seat is mounted on one wall of the frame and the seat may be moved to a horizontal position to allow the young child to sit down. The disadvantage of this device is that it is only useful for a child who can already stand on their own for protracted periods of time and who can indicate that they are tired and wish to sit down. Furthermore, depending on the size of the frame, it may be necessary to remove the child from the stroller in order to move the seat from a storage position to a position where the child can sit on the same The stroller also makes no provision for the child being able to be reclined or semi-reclined so that they may fall asleep.

U.S. Pat. No. 5,125,674 discloses a stroller that may be converted into a playpen. The stroller includes a seat that may be collapsed so that the child is free to stand surrounded by the frame. The stroller is unlikely to be pushed around with the child in a standing position because the frame is too large and the child would likely fall over. Additionally, in order for the child to move between a sitting and standing position the parent would have to physically remove the child from the seat or physically place the child in the seat.

U.S. Pat. No. 5,839,748 issued to Cohen discloses a convertible stroller that carries a child in one of a seated and a standing position. Again, this stroller is designed for an older child who can stand up independently for a substantial length of time. One of the disadvantages of this device is that the child has to be physically removed from the stroller in order to adjust the device as the seat has to be unfolded in order to form the floor upon which the child can stand. Additionally, the child cannot independently move between a seated and a standing position, nor can they move between the two positions frequently or on the spur of the moment. The child has to be able to convey their desire to the parent who must then remove the child from the stroller, make the necessary adjustments and then return the child to the stroller. Obviously, most parents will not be willing to go through this procedure every time the child wants to change their orientation!

There is therefore a need in the art for an improved stroller for a child who is not yet walking or standing independently. Furthermore, there is a need for a stroller that will allow a child to be more physically active while being retained in the stroller.

SUMMARY OF THE INVENTION

The device of the present invention comprises a stroller for a young child. The stroller includes a frame mounted on a plurality of wheels and a seat mounted in the frame. The seat is adjustable between a first position where the child is retained in a reclined or semi-reclined orientation, and a second position where the child is retained in an orientation that permits them to sit and stand. The seat includes a bottom that is pivotally attached to a back. A sling member is secured between the frame and back such that when the bottom is pivoted out of the way, the sling supports the child in the seated or standing position.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

DETAILED DESCRIPTION OF THE INVENTION

Figure 1:
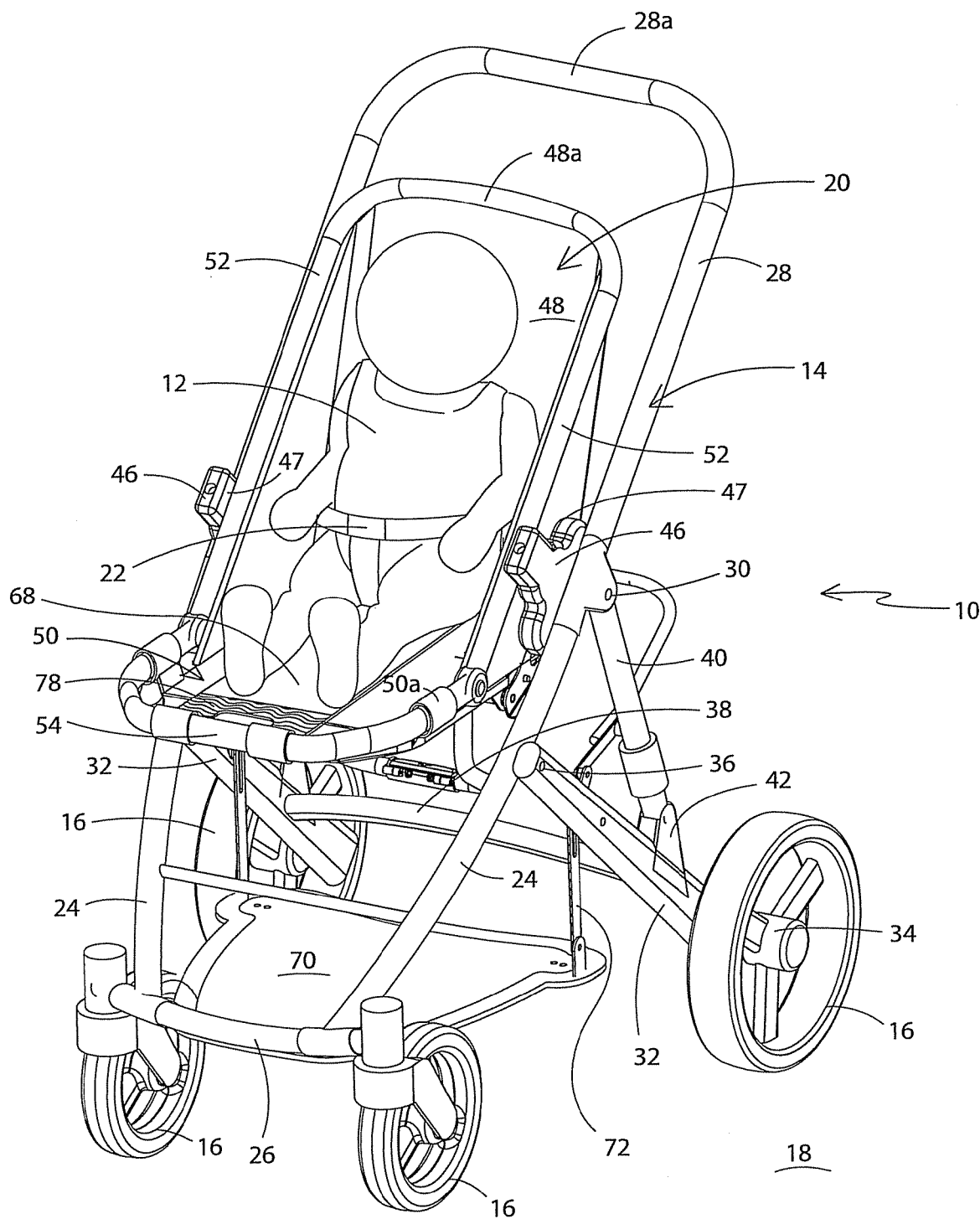
FIG. 1 is a perspective view of the activity stroller of the present invention with the seat in a first position which permits a child to be retained in a semi-reclined position where the child is substantially seated with their legs extending outwardly in front of their body and supported on the seat and generally parallel to the surface.

Referring to FIGS. 1-10, there is shown an adjustable activity stroller in accordance with the present invention and generally indicated at 10. Stroller 10 is designed for a young child 12, especially one who may not yet be able to stand or walk independently. Stroller 10 includes a frame 14 mounted on a plurality of wheels 16 so as to permit the stroller to move across a surface 18. A seat 20 is provided for retaining child 12. A restraint system 22 is mounted on frame 14 and is used to releasably secure child 12 in seat 20. Preferably, restraint 22 is a three or four point harness that will securely retain the child within stroller 10.

Frame 14 includes a pair of spaced apart side members 24 which extend upwardly and outwardly away from a crosspiece 26. Side members 24 are each fixedly connected to crosspiece 26. A U-shaped handle member 28 extends between the two side members 24 and is connected to each member 24 by a pivot pin 30. This permits handle member 28 to fold into abutting contact with side members 24 when stroller 10 is collapsed as will be described hereinafter. A middle region 28a of handle member 28 forms a handlebar 28a that may be grasped by the parent to maneuver stroller 10. Handlebar 28a is opposed to crosspiece 26 and is generally parallel thereto. A strut 32 extends rearwardly and downwardly between each side member 24 and an axle 34 of one of rear wheels 16b. Each strut 32 is pivotally secured to side member 24 by a pivot pin 36. A second crosspiece 38 extends between struts 32 to give frame 14 rigidity. A gas shock absorber 40 is secured between handle member 28 and each strut 32. Each shock absorber 40 is pivotally mounted by pivot pin 30 to handle member 28 and is secured by a second pivot pin 42 to the associated strut 32. A support 44 extends between struts 32 are extends rearwardly and outwardly away therefrom to provide a place for a diaper bag or other articles not shown) to be hung therefrom or rested thereon.

Seat 20 is secured into frame 14 by a pair of seat mounting blocks 46. Seat 20 has a back 48, a bottom 50 and a pair of sides 52 extending forwardly and downwardly from an outermost end 48a (FIG. 1) of back 48. Mounting blocks 46 are secured between sides 52 and one or both of handle member 28 and side members 24. A U-shaped bar 54 connects the lowermost ends of sides 52 together and extends outwardly and forwardly away therefrom. Bar 54 is oriented generally horizontally so as to be substantially parallel to the surface 18 across which stroller 10 is to travel.

Figure 4:
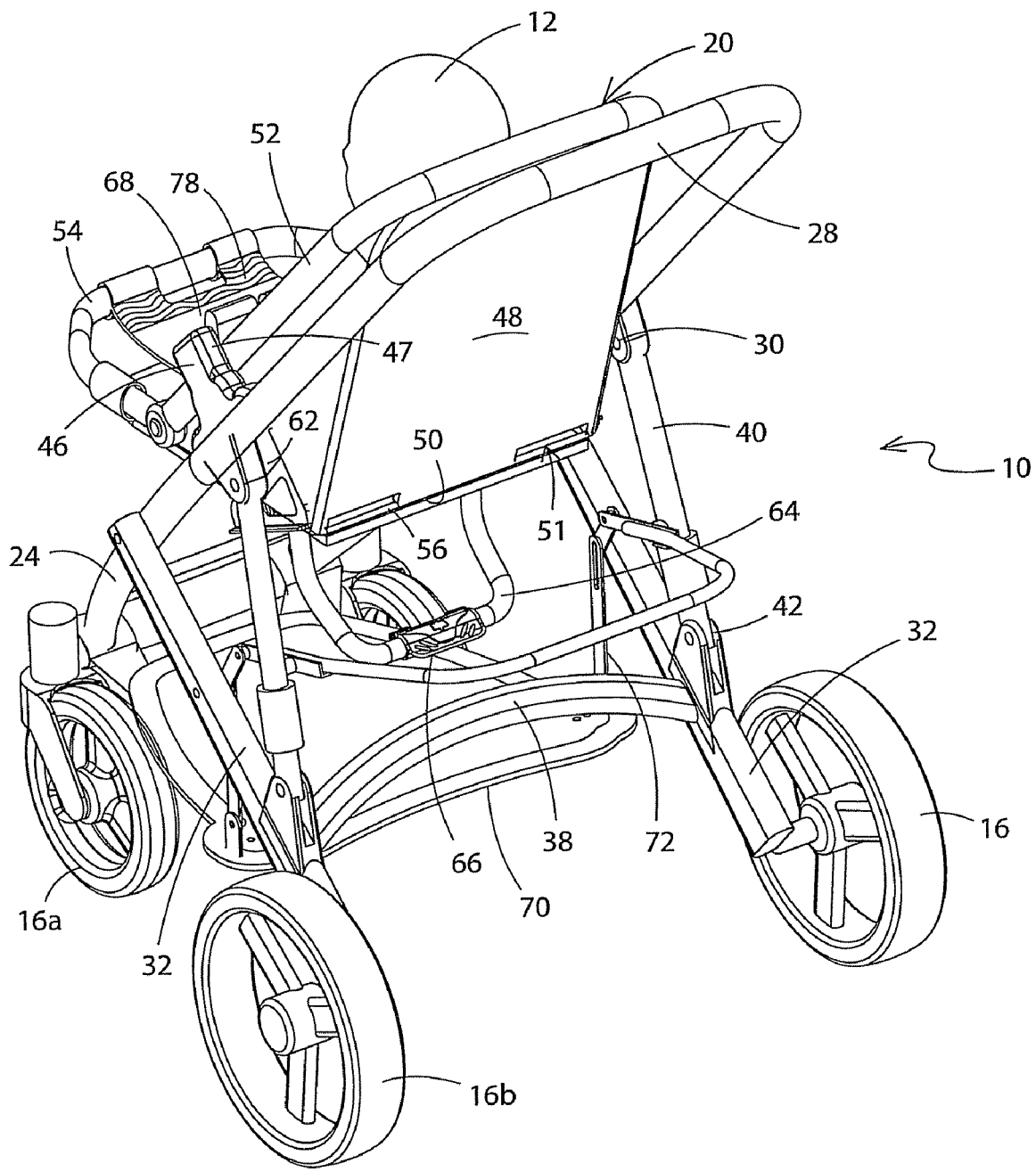
FIG. 4 is a perspective view of the rear of the stroller showing the position of the release bar when locked in place by the catch and with the seat in the first position.
Figure 5:
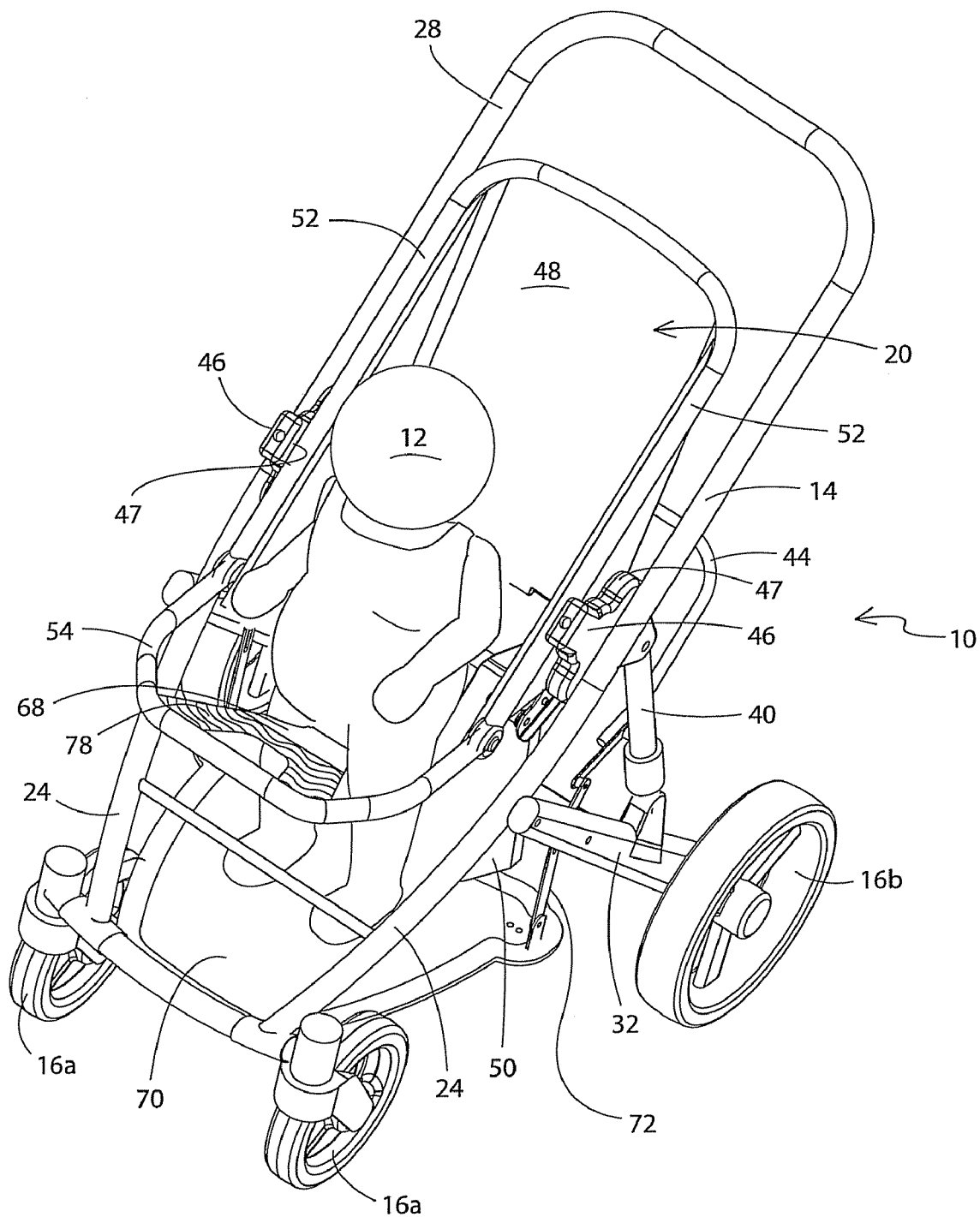
FIG. 5 is a perspective view of the activity stroller in accordance with the present invention showing the seat in a second position which permits the child to stand up in the stroller or to be supported in a sitting position on a sling member with their feet hanging downwardly toward the surface.
Figure 6:
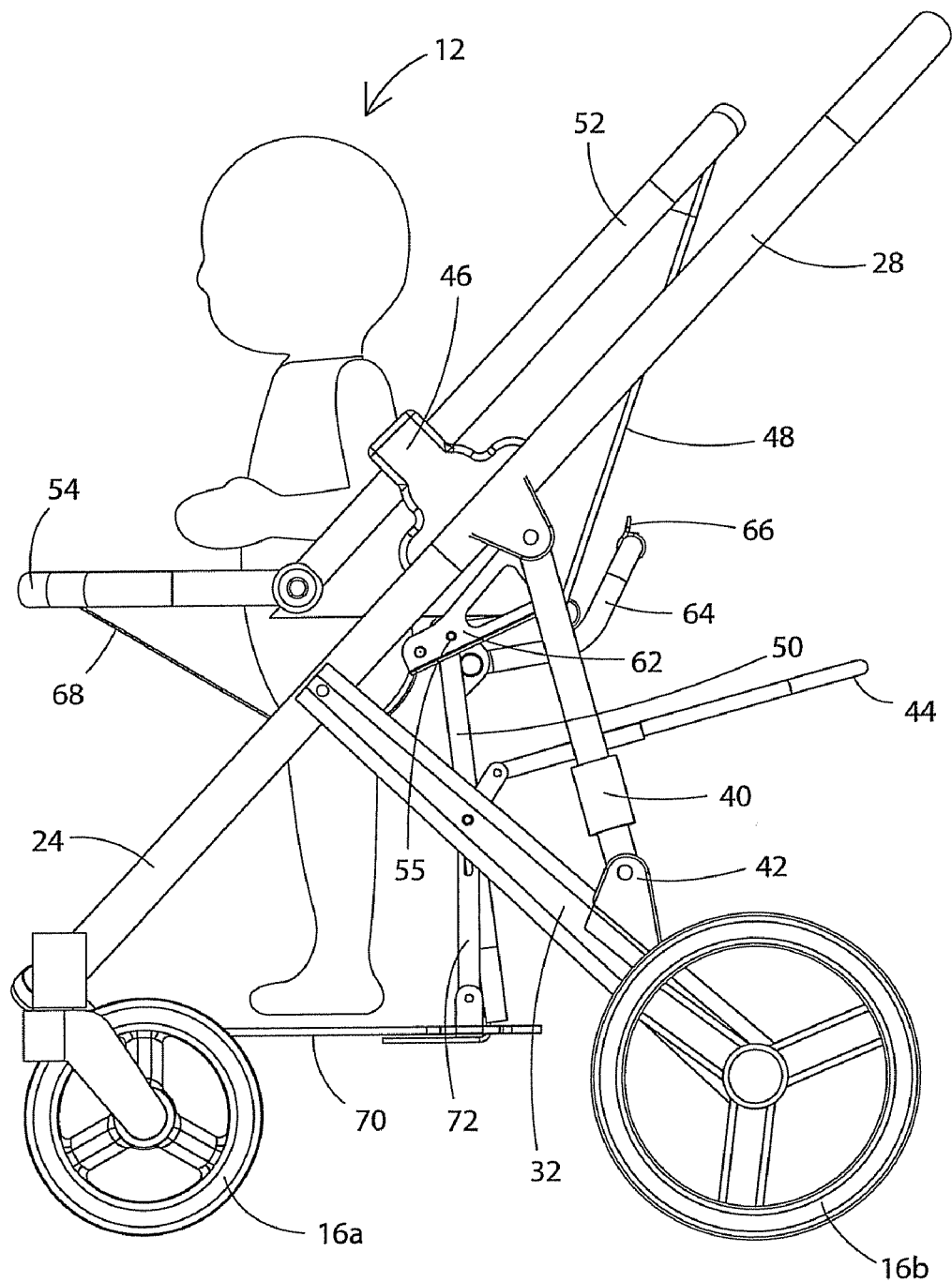
FIG. 6 is a side view of the stroller of FIG. 5 with the child standing up therein.
Figure 7:
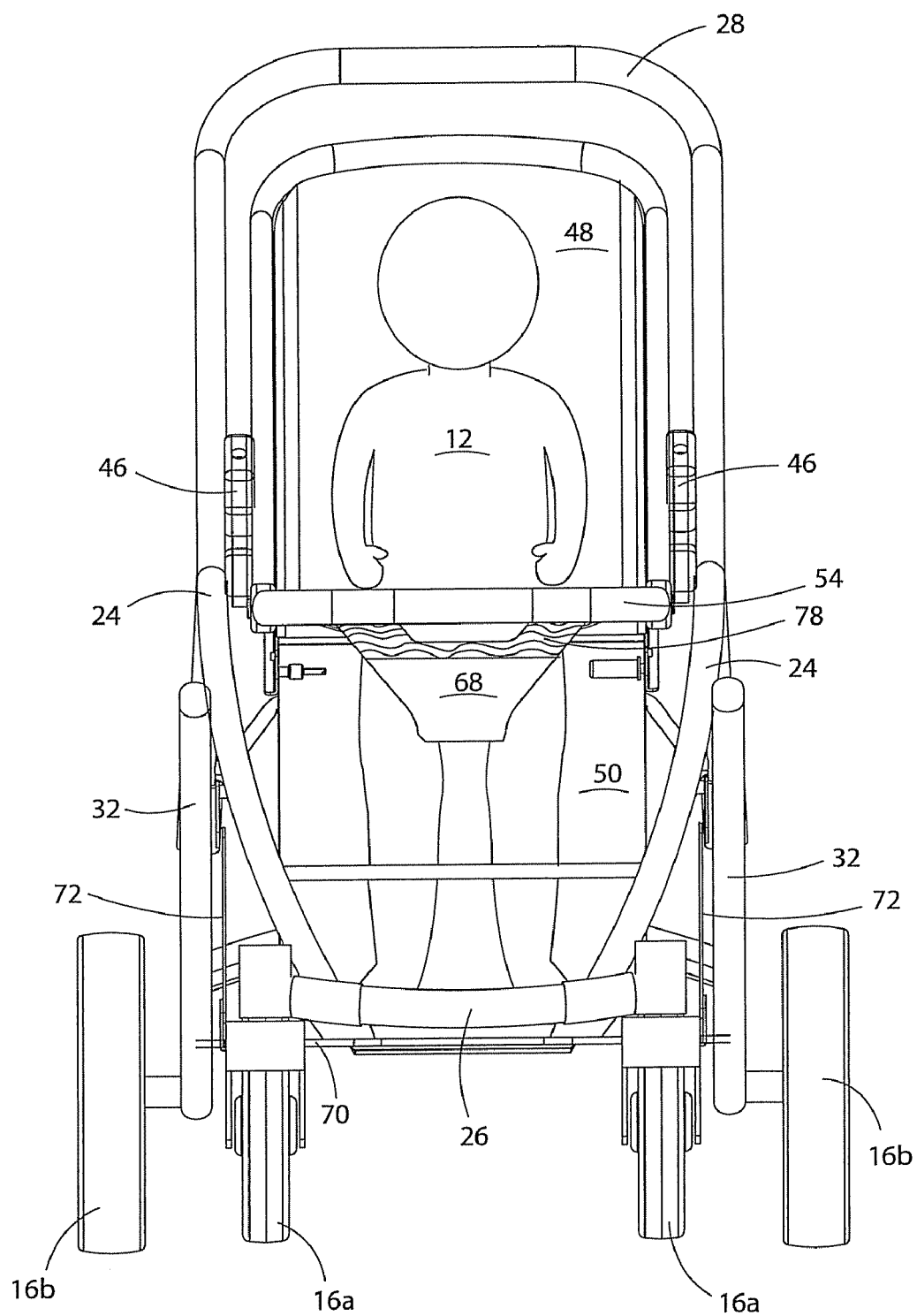
FIG. 7 is a front view of the stroller of FIG. 5.
Figure 8:
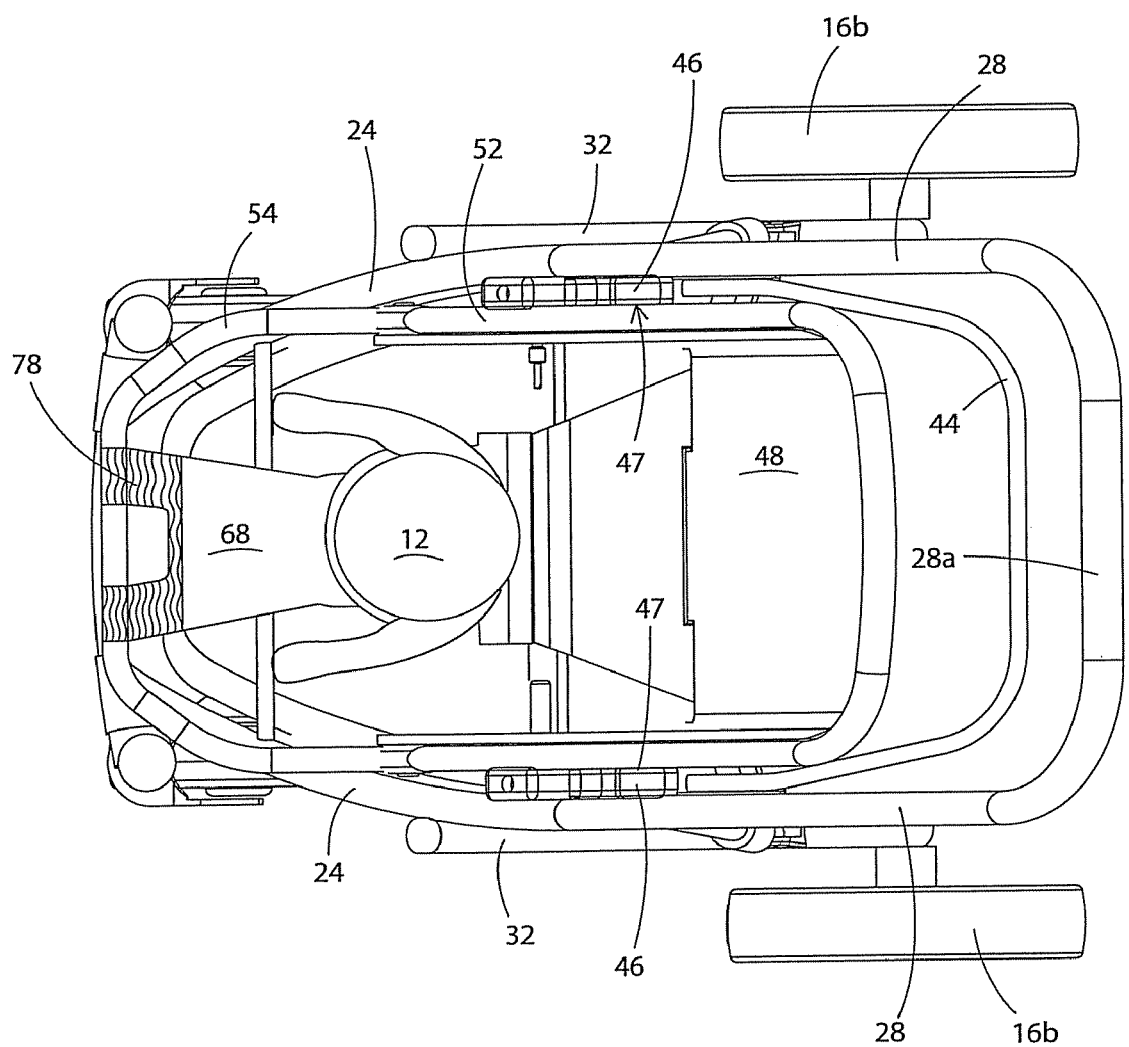
FIG. 8 is a top view of the stroller of FIG. 5.
Figure 9:
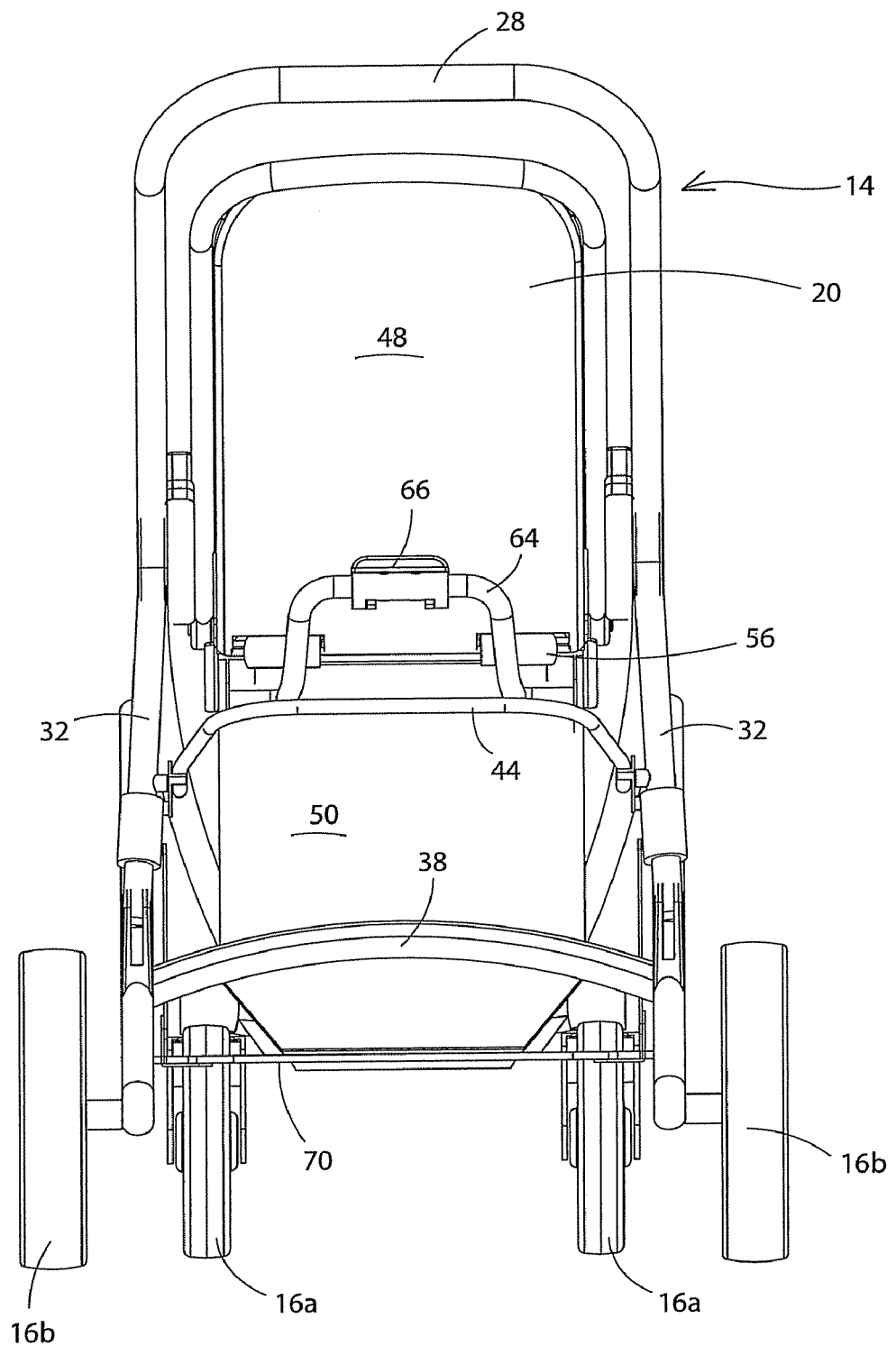
FIG. 9 is a rear view of the stroller of FIG. 5.

In accordance with a specific feature of the present invention, back 48 and bottom 50 of seat 20 are hingedly connected together by a hinge 55 (FIG. 4). Hinge 55 permits bottom 50 of seat 20 to be moved between a first position and a second position. In the first position, shown in FIGS. 1-4, bottom 50 is substantially horizontal and will be generally parallel to the surface 18 over which stroller 10 travels. When bottom 50 is in this first position, the child's legs will rest on the upper surface 50a thereof as is shown in FIG. 1. When bottom 50 of seat 20 is moved into the second position, shown in FIGS. 5-9, bottom is substantially vertical and will be generally perpendicular to the surface over which the stroller 10 travels. There is therefore around a ninety degree difference in the orientation of bottom 50 between the first and second positions.

Figure 10:
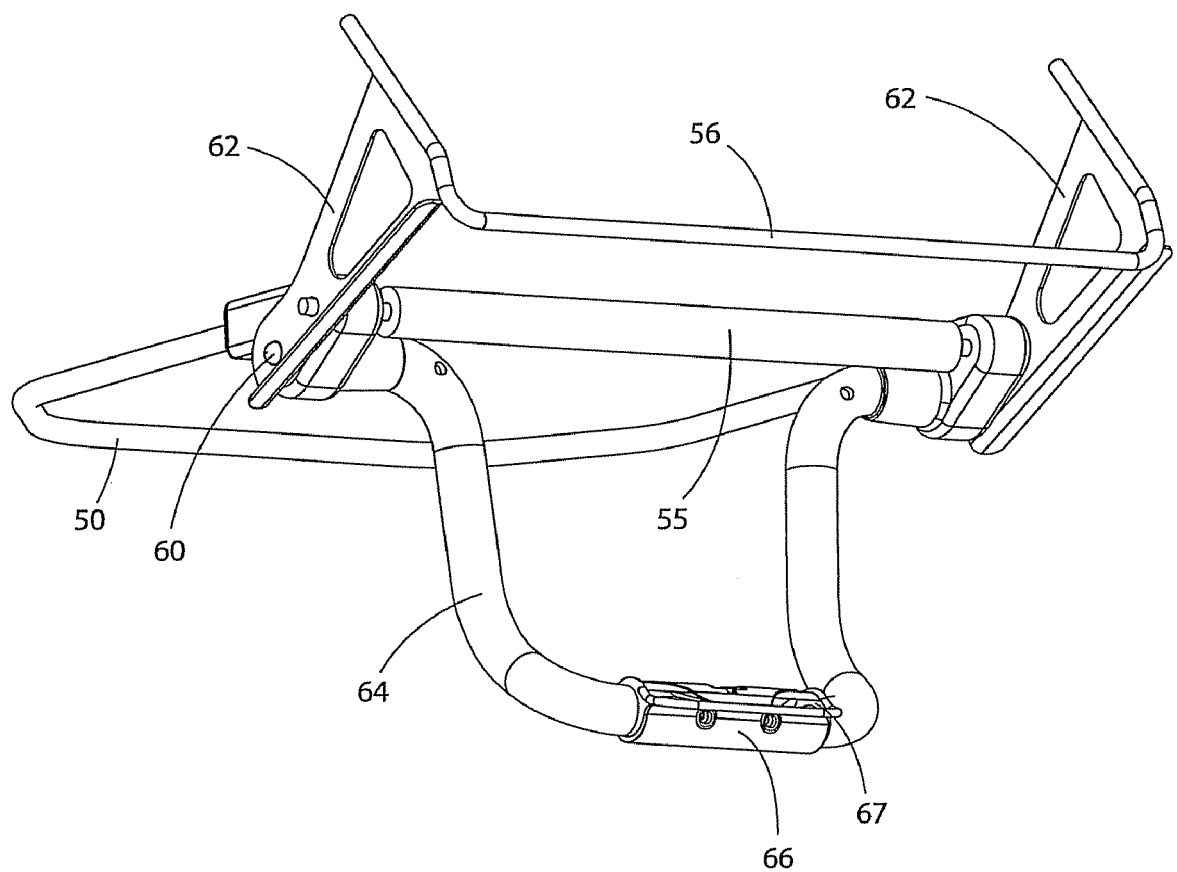
FIG. 10 is a first perspective view of a locking assembly for the seat shown detached from the stroller for clarity.
Figure 11:
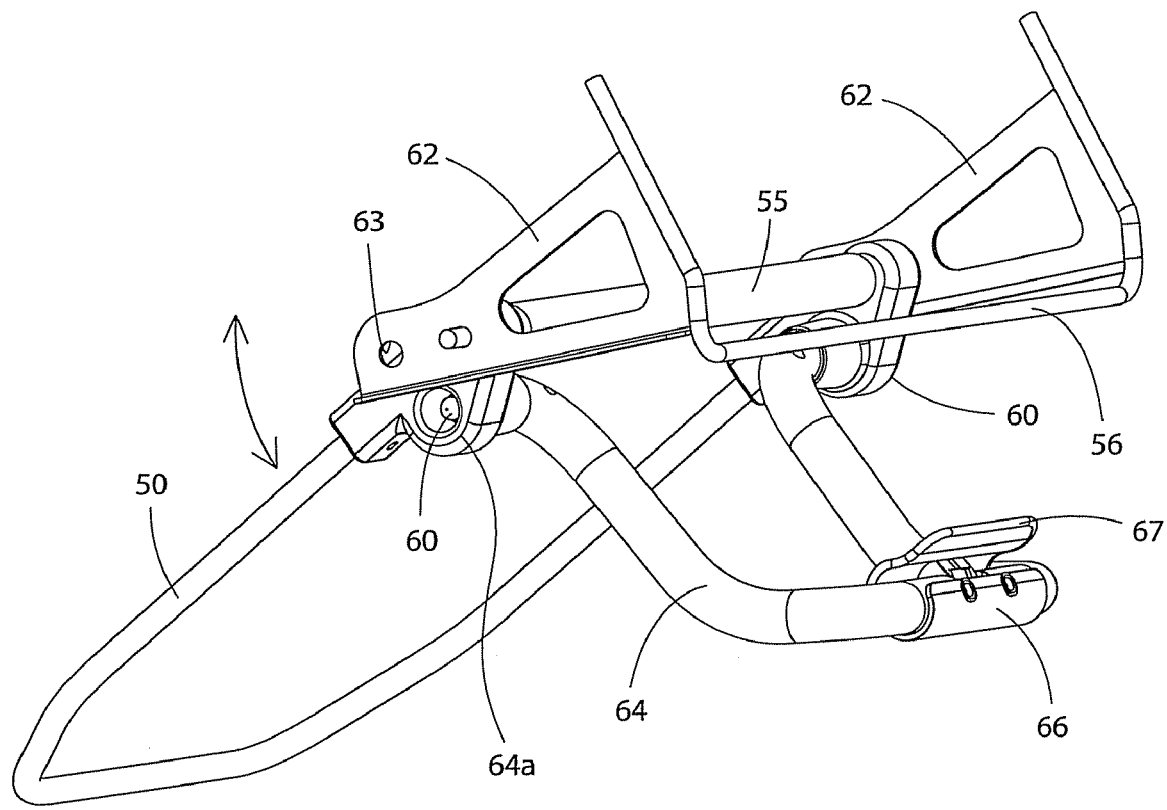
FIG. 11 is a second perspective view of the locking assembly.
Figure 12:
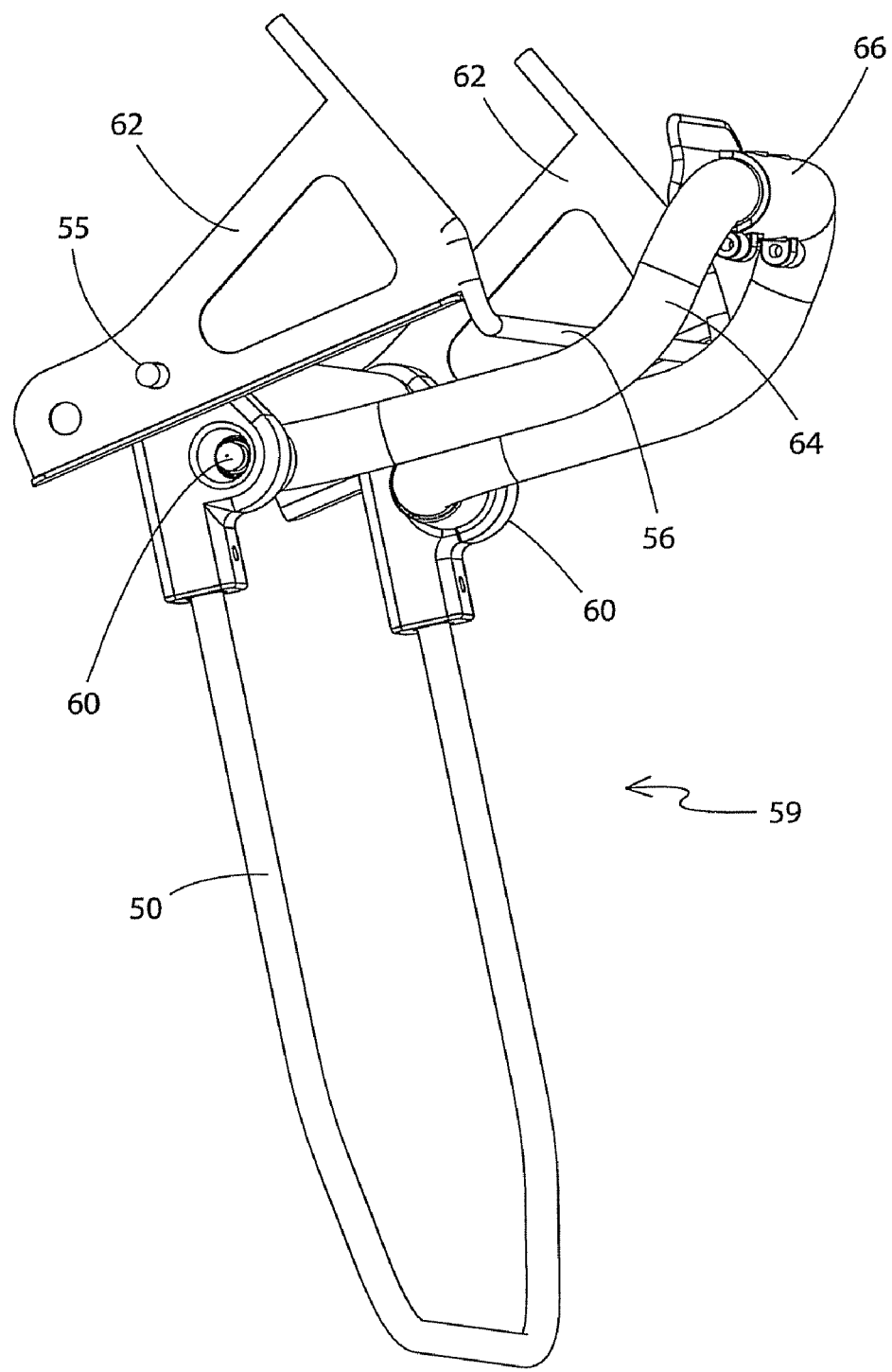
FIG. 12 is a third perspective view of the locking assembly.
Figure 13:
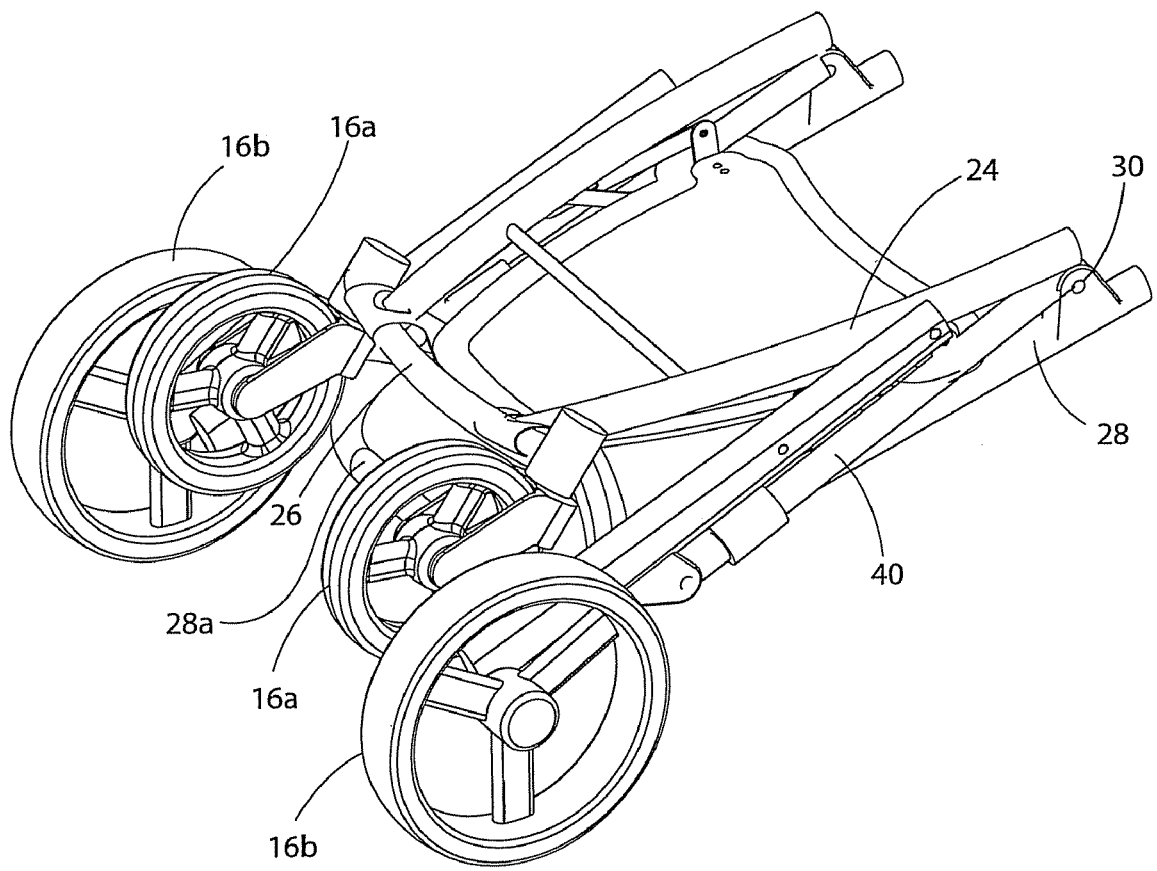
FIG. 13 is a perspective view of the stroller in a completely collapsed position for storage.

Referring to FIGS. 10-12, a locking assembly 59 is provided to selectively retain seat 20 in one or each of the first and the second positions. The components of the assembly are shown detached from the stroller for the sake of clarity. Assembly 59 is disengaged to permit movement between the first and second positions and is engaged to retain seat 20 in one of the first and second positions. Assembly 59 comprises two brackets 62 that are secured to opposing sides of support 56 on bottom 50 of seat 20, a U-shaped release lever 64 that is connected between the two brackets 62 and a catch 66 mounted on the lever 64. As shown in FIG. 11, a locking pin 60 projects outwardly from each end 64a of release lever 64 and is configured to be received into an aperture 63 on each bracket 62. A wire cable (not shown) extends interiority through a hollow bore of lever 64 from each locking pin 60 to the catch 66. Release lever 64 is operationally connected to the frame of the bottom 50 of seat 20. When the handle extension 67 is depressed inwardly toward release lever 64 by the parent grasping the same, the wire cables are operationally engaged and cause the locking pin 60 to be withdrawn from apertures 63 in brackets 62. The release handle 64 is therefore able to be pivotally raised toward handle 28a, thus causing bottom 50 to drop downwardly and away from under the child 12. When the parent lets go of catch 66, locking pins 60 return to their original position extending outwardly from the bore of lever 64. Even if bottom 50 swings a little toward the front of stroller 10, locking pins 65 will engage the side edge of brackets 62 and will prevent any further motion forward. When the parent wishes to reposition the bottom 50 back under the child, they grasp catch 66, depressing handle extension 67 and thereby withdraw locking pins 60 back into the bore thereof. The parent will then push downwardly on the catch 66 thereby rotating release lever 64 until locking pins 60 align once again with apertures 63. The catch 66 is released and locking pins slide back into engagement in apertures 63, thereby locking assembly 59 back in place.

Figure 2:
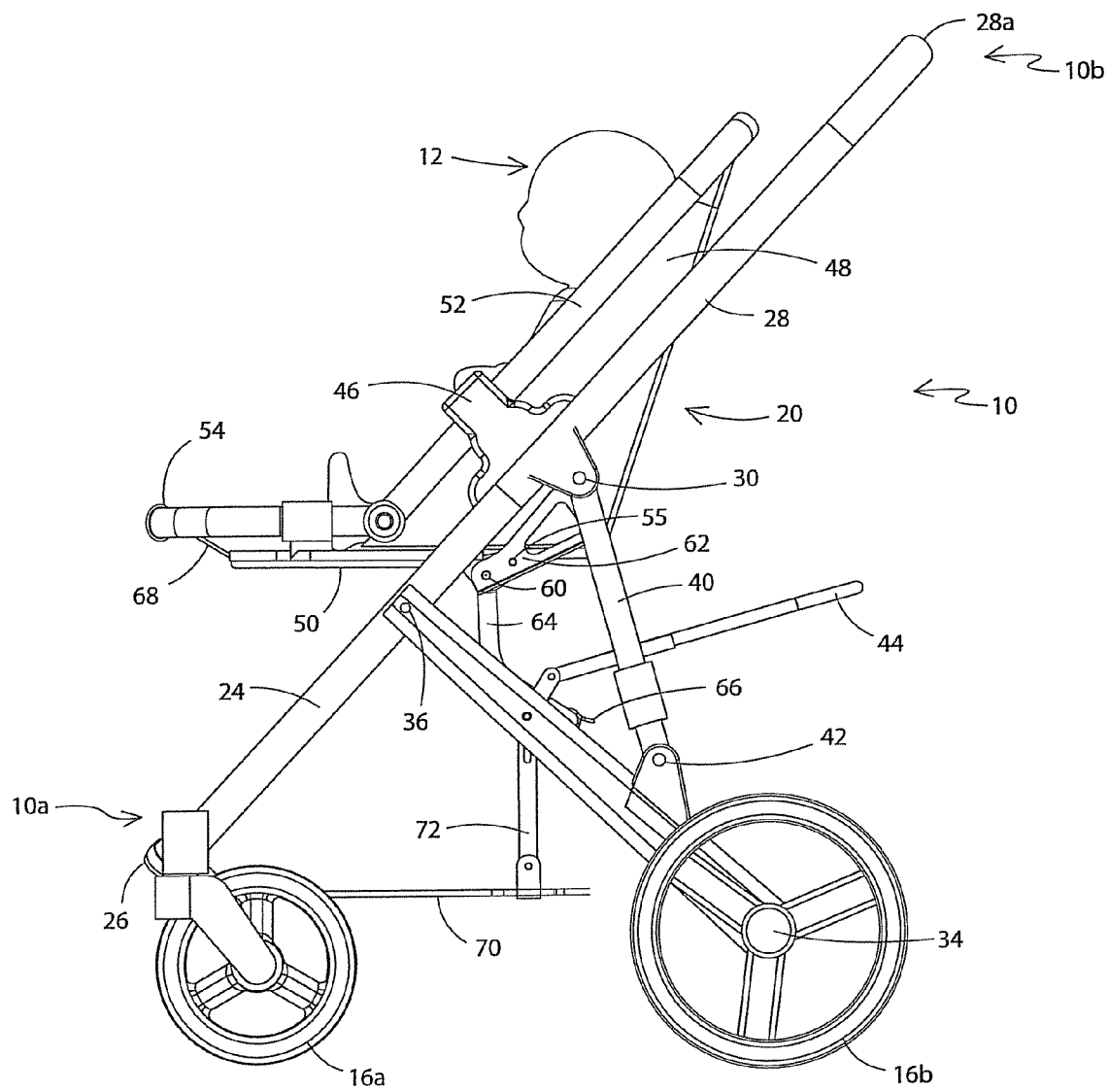
FIG. 2 is a side view of the stroller of FIG. 1.
Figure 3:
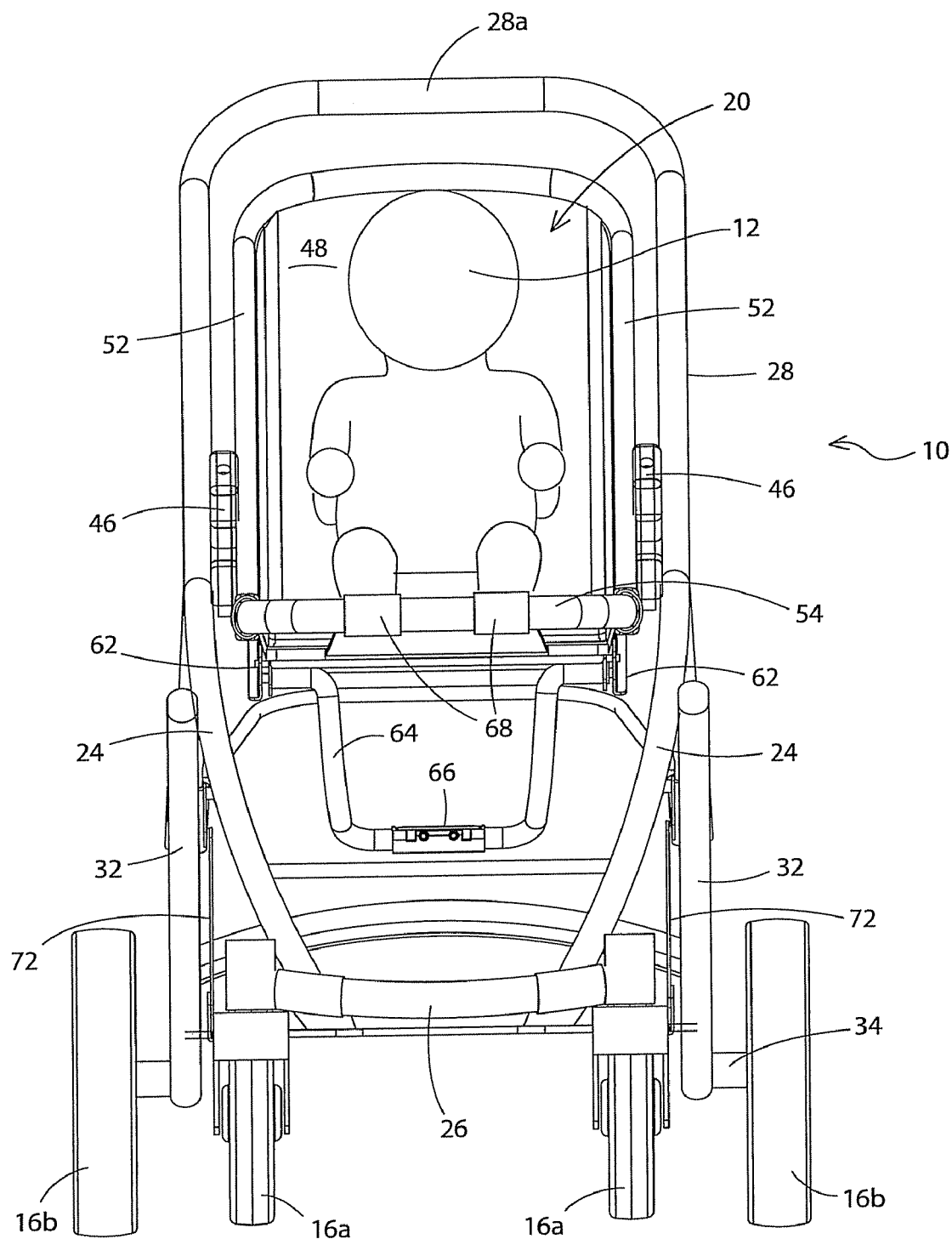
FIG. 3 is a front view of the stroller of FIG. 1.

In accordance with yet another specific feature of the present invention, a sling member 68 is secured between a portion of frame 14 and a region of seat 20 proximate support 56. Preferably, sling member 68 is permanently secured in place between bar 54 and back 48 of seat 20. Sling member 68 is made from a flexible material, preferably a strong fabric that is of sufficient strength to support the weight of child 12 thereon when seat 20 is in the second position. Sling member 68 is substantially Y-shaped having its wider end secured to bar 54 and its narrower end secured to back 48. As shown in FIG. 2, bottom 50 of seat 20 does not extend all of the way forward from hinge 56 to bar 54 when the seat is in the first position. In this first position, sling member 68 rests on the uppermost surface 50a of bottom 50. When bottom 50 is moved to the second position, as will be hereinafter described, sling member 68 substantially does not contact bottom 50 of seat 20 and is suspended between its connection point at hinge 56 and bar 54. The purpose of sling member 68 will be hereinafter described.

In accordance with yet another specific feature of the present invention, stroller 10 also includes a substantially solid floor 70 that is mounted to frame 14. Floor 70 preferably is manufactured from plastic and is rigidly but adjustably mounted to frame 14. A front end of floor 70 is pivotally secured to crosspiece 26 and a rear end of floor 70 is secured to struts 32 by way of adjustable straps 72. Floor 70 is disposed a spaced distance beneath bottom 50. This distance may be changed at any time by adjusting straps 72 so that the distance is either increased or decreased as is desired.

Stroller 10 is used in the following manner. When the parent wants to recline the child in stroller 10 or to have them sit with their legs substantially parallel to surface 18, the bottom 50 of seat is placed in the first position so that it extends substantially horizontally in the stroller 10. This places bottom 50 of seat 20 substantially at an angle of between ninety degrees and one hundred and ten degrees relative to back 48. Restraint 22 is positioned around the body of child 12 so that they cannot fall out of stroller 10.

When the child becomes restless or when the parent wishes to have the child sit in such a manner that their legs hang downwardly toward the surface 18, the parent detaches restraint 22, and while holding the child in seat 20 with one hand, grasps lever 64 with the other hand. When the handle extension 67 is depressed inwardly toward release lever 64, the wire cables within release handle 64 are engaged, thereby causing the locking pin 60s to be withdrawn from apertures 63 in brackets 62. The parent then pivots lever 64 upwardly toward handle 28a from the position shown in FIG. 2 to the position shown in FIG. 6. This rotational movement causes bottom 50 of seat 20 to be moved from the first position where it is substantially horizontal relative to surface 18, to the second position where it is substantially vertical relative to the surface 18. When the parent lets go of catch 66, the locking pins 60 return to their original position projecting outwardly from the bore of lever 64. Even if bottom 50 swings a little toward the front of stroller 10, locking pins 65 will engage the side edge of brackets 62 and will prevent any further forward motion. When bottom 50 is in this second position, it is at an angle of between one hundred and eighty degrees and two hundred degrees relative to back 48 of seat 20. Bottom 50 therefore moves through an arc of about ninety degrees between the first and second positions.

As the bottom 50 of the seat pivots away from sling member 68, the child slides forwardly and downwardly along sling member 68 and becomes suspended thereon in a seated position. The parent will, of course, ensure that the child's legs extend downwardly on opposite sides of sling member 68 (FIG. 6) before they release the catch 66. If the child's feet do not touch floor 70 when bottom 50 is in the second position, straps 72 may be adjusted to move floor 70 upwardly so that the child's feet rest or almost rest on the uppermost surface of floor 70. The parent then reapplies restraint 22 to the child's body to ensure that they do not accidentally fall out of stroller 10.

Since sling member 68 is made from flexible or resilient material, it will stretch slightly so that the child can bounce up and down on floor 70 if they desire to do so. Alternatively or additionally, elastic or resilient members 78, such as straps or springs may be provided on sling member 68. Elastic members 78 may be attached to the front end of sling member 68 or to the back end thereof or to both of the front and back ends. Elastic members may be adjustable to provide just enough support so as to not let the child collapse to their knees and to also remove some of the weight off of their feet and legs. The elastic members 78 give the child the freedom to bounce up and down and to swing their legs freely but, at the same time, aid in substantially preventing the child from falling out of the stroller 10. This arrangement gives the child 12 more freedom so that they are not confined to the same degree as when the bottom 50 is in the first position. The proximity of floor 70 to the child's feet also encourages the child to stand and bounce up and down. Additionally, when bottom 50 is in the second position the child is in a full standing position.

When child 12 becomes tired from moving around or being in a standing position, the parent can move them back into a reclined or semi-reclined position without removing them from stroller 10. This is accomplished by repositioning the bottom 50 back under the child's body. The parent grasps catch 66 on lever 64 thereby depressing handle extension 67 and thereby withdrawing locking pins back into the bore of lever 64. Then, while steadying the child with the other hand, the parent pushes downwardly on the catch 66 rotating release lever 64 until locking pins 60 align once again with apertures 63 in brackets 62. This pivotal movement causes the bottom 50 to move from the second position back into the first position. The catch 66 is released and this causes locking pins 60 to slide back into engagement in apertures 63, thereby securing the locking assembly 59 back in place. Bottom 50 is thereby locked into the first position so that it does not accidentally drop out from beneath the child. Floor 70 may be used as a shelf to carry various articles when the child is in a semi-reclined or fully reclined position. As may be seen, there is no requirement to remove the child from stroller 10 in order to move floor 50 between the first and second positions.

It should be noted that bar 54 act as a handrest for the child when the bottom 50 of seat 20 is in the second position. Mesh sides (not shown) may also be provided extending between bar 54 and bottom 50 to ensure that the child is safely retained in stroller 10. Bar 54 merely acts as a bumper when bottom 50 of seat is in the first position and is generally coplanar with the bottom 50.

It should also be noted that when the bottom 50 is in each of the first and second positions, the child's center of gravity is maintained at a low position and behind the center of gravity of the stroller 10 so that the stroller will not accidentally tip over as it moves across the surface 18.

When the stroller 10 is no longer required, it may be collapsed to allow it to be transported or stored. The collapsed stroller 10 is shown in FIG. 10 with the seat 20 detached therefrom. Seat 20 is separately usable as a carrier seat. Brackets 46 on frame 14 engage complementary brackets 47 on seat 20 to lockingly engage seat 20 to frame 14. Stroller 10 is collapsed by rotating handle member 28 about pivot pin 30 so that handle member 28 is in abutting contact with side members 24 and wheels 16b are on either side of wheels 16a.

It will be understood by those skilled in the art that instead of the bottom of the seat being pivotally movable between the first and second orientations, the stroller could instead include a removable bottom that is detached in order to permit the child to be supported by the sling member.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. An adjustable stroller for a child, said stroller comprising:
   a frame including:
      a first side member having a first end and a second end;
      a second side member having a first end and a second end, wherein said second side member is disposed a spaced distance laterally away from the first side member;
      a first strut extending outwardly and downwardly from the first side member and intermediate the first and second ends thereof;
      a second strut extending outwardly and downwardly from the second side member and intermediate the first and second ends thereof;
   a plurality of wheels mounted to the frame and adapted to engage a surface over which the stroller is to travel; and wherein the plurality of wheels includes a pair of second wheels, and wherein each one of the pair of second wheels is mounted to a free end of one of the first and second struts;

a seat mounted to the first and second side members and positioned therebetween and wherein said seat is adapted to retain a child thereon;

a floor connected to the frame proximate the wheels and disposed vertically directly beneath the seat, and wherein at least a portion of said seat is movable between a first position where the child is retained in one of a reclined and semi-reclined orientation; and a second position where the child is retained in an orientation where the child is able to either sit or to stand on the floor without getting out of the seat.

2. The stroller as defined in claim 1, wherein a first region of the floor is pivotally mounted to the frame and at least a second region of the floor is movable one of toward and away from the seat.

3. The stroller as defined in claim 2, further comprising one or more adjusting straps extending between the frame and the floor, and wherein the position of the second region of the floor relative to the seat is changed by lengthening or shortening said straps.

4. The stroller as defined in claim 1, wherein the seat comprises:
a back;
a bottom; and
a hinge connecting the bottom to the back, whereby the bottom is movable about the hinge relative to the back; and when the bottom is in a first orientation relative to the back the seat is in the first position, and when the bottom is in a second orientation relative to the back, the seat is in the second position.

5. The stroller as defined in claim 4, wherein the bottom is retained at an angle of between ninety degrees and one hundred and ten degrees relative to the back when in the first orientation.

6. The stroller as defined in claim 4, wherein the bottom is retained at an angle of between one hundred and eighty degrees and two hundred degrees relative to the back when in the second orientation.

7. The stroller as defined in claim 4, wherein the bottom of the seat pivots through around ninety degrees between the first and second positions.

8. The stroller as defined in claim 4, further including a locking mechanism that is disengaged to permit the bottom of the seat to move relative to the back thereof.

9. The stroller as defined in claim 4, further comprising a sling member that extends between the frame and a region of the seat adjacent the hinge; and wherein the sling member abuts the bottom when the seat is in the first position and is suspended between the back and the frame when the seat is in the second position.

10. The stroller as defined in claim 9, wherein the sling member is permanently attached between the frame and the region of the seat, and the sling member abuts an upper surface of the bottom when the seat is in the first position.

11. The stroller as defined in claim 10, wherein the sling member is substantially Y-shaped and is widest proximate the frame.

12. The stroller as defined in claim 11, wherein the sling member is comprised of a flexible material and is of sufficient strength to support the weight of the child thereon when the seat is in the second position.

13. The stroller as defined in claim 9, wherein the frame further includes a substantially U-shaped handrest mounted such that it extends outwardly and forwardly away from the seat; and wherein the sling member extends between the handrest and the region of the seat adjacent the hinge.

14. The stroller as defined in claim 9, further comprising a plurality of elastic members connected to the sling member to permit said sling member to resiliently move with the child.

15. The stroller as defined in claim 4, further including a release lever connected to the bottom of the seat, said release lever being engageable to move the bottom of the seat between the first and second orientations.

16. The stroller as defined in claim 15, further including a locking mechanism, a catch mounted on the release lever and operationally connected to the locking mechanism, and wherein the catch is depressed on the release lever to disengage the locking mechanism and permit rotational movement of the release lever to move the seat between the first and second positions.

17. The stroller as defined in claim 16, wherein the release lever extends rearwardly away from the hinge on the seat and is adapted for single-handed operation to disengage the locking mechanism and move the seat between the first and second positions.

18. The stroller as defined in claim 1, wherein the floor is substantially rigid.

19. The stroller as defined in claim 1, wherein the frame is collapsible for storage and the floor pivots to fold up with the frame.

20. The stroller as defined in claim 1, wherein the plurality of wheels includes a pair of first wheels and wherein each one of the pair of first wheels is mounted proximate the second end of one of the first and second side members.

21. The stroller as defined in claim 1, wherein the frame further comprises:
a crosspiece extending between the second ends of the first and second side members, and
the floor is spaced a distance beneath the seat; wherein a front end of the floor is connected to the crosspiece and a rear end of the floor is connected to the first and second struts and wherein the seat includes a bottom region adapted to support the child thereon when in a seated position, and wherein the bottom region is movable out of the way so as to permit the child to stand on the floor.

22. The stroller as defined in claim 21, wherein the front end of the floor is pivotally engaged with the crosspiece and the rear end of the floor is pivotally connected to the first and second struts.

23. The stroller as defined in claim 1, further comprising at least one shock absorber connected between one of the first and second struts and the associated one of the first and second side members; and wherein the at least one shock absorber is pivotally engaged with the associated first and second side member.

24. The stroller as defined in claim 1, wherein the seat is detachably engaged with the first and second side members, and wherein the seat is separately usable as a child carrier when so detached.

25. The stroller as defined in claim 24, wherein the stroller is foldable for storage or transportation, and wherein the seat is detached from the frame prior to folding the stroller.

* * * * *